(12) United States Patent
Cai et al.

(10) Patent No.: US 9,959,332 B2
(45) Date of Patent: May 1, 2018

(54) SYSTEM AND METHOD FOR MASSIVELY PARALLEL PROCESSOR DATABASE

(71) Applicant: Futurewei Technologies, Inc., Plano, TX (US)

(72) Inventors: Le Cai, Cupertino, CA (US); Qingqing Zhou, Santa Clara, CA (US); Kamini Jagtiani, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 348 days.

(21) Appl. No.: 14/601,679

(22) Filed: Jan. 21, 2015

(65) Prior Publication Data
US 2016/0210340 A1    Jul. 21, 2016

(51) Int. Cl.
G06F 17/30        (2006.01)

(52) U.S. Cl.
CPC ................ *G06F 17/30575* (2013.01)

(58) Field of Classification Search
CPC .............. G06F 9/466; G06F 17/30008; G06F 17/30339; G06F 17/30348; G06F 17/30445; G06F 17/30575
(Continued)

(56) References Cited

U.S. PATENT DOCUMENTS 6,523,036 B1 * 2/2003 Hickman .......... G06F 17/30575
707/704
7,152,026 B1 * 12/2006 Merritt ............... G06F 11/2028
703/13

(Continued)

FOREIGN PATENT DOCUMENTS

CN    102521297 A    6/2012
CN    104239417 A    12/2014
(Continued)

OTHER PUBLICATIONS

Shahhoseini et al., Shared Memory Multistage Clustering Structure, An Efficient Structure for Massively Parallel Processing Systems, Proceedings Fourth International Conferenece/Exhibition on High Performance Computing in the Asian-Pacific Region, Year: 2000, vol. 1 pp. 22-27.*

(Continued)

*Primary Examiner* — Greta L Robinson

(74) *Attorney, Agent, or Firm* — Futurewei Technologies, Inc.

(57) ABSTRACT

In one embodiment, a method includes determining a number of initial servers in a massively parallel processing (MPP) database cluster and determining an initial bucket configuration of the MPP database cluster, where the initial bucket configuration has a number of initial buckets. The method also includes adding a number of additional servers to the MPP database cluster to produce a number of updated servers, where the updated servers include the initial servers and the additional servers and creating an updated bucket configuration in accordance with the number of initial servers, the initial bucket configuration, and the number of additional servers, where the updated bucket configuration has a number of updated buckets. Additionally, the method includes redistributing data of the MPP cluster in accordance with the updated bucket configuration.

19 Claims, 6 Drawing Sheets

(58) Field of Classification Search
USPC ...... 707/999.01, 999.08, E17.007, 674, 675, 707/679, 680, 681, 682, 683, 684, 685, 707/686, 714, 715, 716, 747, 764, 770; 709/203, 215, 224; 718/105
See application file for complete search history.

(56) References Cited

U.S. PATENT DOCUMENTS

| | | | | |
|---|---|---|---|---|
| 8,738,624 | B1* | 5/2014 | Wang | G06F 17/30584 707/737 |
| 2002/0120727 | A1* | 8/2002 | Curley | H04L 41/12 709/223 |
| 2010/0049722 | A1 | 2/2010 | Xu et al. | |
| 2010/0293334 | A1* | 11/2010 | Xun | G06F 17/30949 711/129 |
| 2012/0311295 | A1* | 12/2012 | Gaur | G06F 9/5072 711/173 |
| 2013/0232133 | A1* | 9/2013 | Al-Omari | G06F 17/30498 707/714 |
| 2014/0108633 | A1 | 4/2014 | Dai et al. | |
| 2016/0171072 | A1* | 6/2016 | Jagtiani | G06F 17/30339 707/613 |

FOREIGN PATENT DOCUMENTS

| | | |
|---|---|---|
| WO | 2014067449 A1 | 5/2014 |
| WO | 2014082602 A1 | 6/2014 |

OTHER PUBLICATIONS

"Amazon DynamoDB Developer Guide," Amazon Web Services™, API Version Aug. 10, 2012, 714 pgs.

"Greenplum Database Getting Started Guide 4.2," GoPivotal, Inc., Rev: A01, Apr. 2014, 56 pgs.

"Dynamo: Amazon's Highly Available Key-value Store"; Proceeding SOSP '07 Proceedings of twenty-first ACM SIGOPS symposium on Operating systems principles; Decandia , et al., pp. 205-220.

"Online Expansion of Large-scale Data Warehouses"; EMC Corp. Data Computing Division; Cohen, J. et al.; pp. 1249-1259; 2011.

* cited by examiner

SYSTEM AND METHOD FOR MASSIVELY PARALLEL PROCESSOR DATABASE

TECHNICAL FIELD

The present invention relates to a system and method for databases, and, in particular, to a system and method for massively parallel processor databases.

BACKGROUND

Massively parallel processing (MPP) database management systems scale by distributing data to servers and running individual transactions on multiple servers. MPP databases distribute data and queries to multiple servers for high throughput and low latency. A shared nothing architecture scales by adding new servers for cluster expansion. MPP databases may enlarge storage and computational capacity by adding more servers. When scaling by adding servers, the distribution of data to the new servers is to be performed. Slower servers may dominate performance, which may be exacerbated by uneven data distribution. The workload of a server may depend on the amount of data stored.

SUMMARY

An embodiment method includes determining a number of initial servers in a massively parallel processing (MPP) database cluster and determining an initial bucket configuration of the MPP database cluster, where the initial bucket configuration has a number of initial buckets. The method also includes adding a number of additional servers to the MPP database cluster to produce a number of updated servers, where the updated servers include the initial servers and the additional servers and creating an updated bucket configuration in accordance with the number of initial servers, the initial bucket configuration, and the number of additional servers, where the updated bucket configuration has a number of updated buckets. Additionally, the method includes redistributing data of the MPP cluster in accordance with the updated bucket configuration.

An embodiment method includes determining an updated bucket-server mapping for a massively parallel processor (MPP) database cluster in accordance with a number of initial servers and a number of added servers and determining whether a first table is to be redistributed in accordance with the updated bucket-server mapping and an initial bucket-server mapping. The method also includes starting a first transaction when the first table is to be redistributed and performing the first transaction including moving data from an initial server of the initial servers to an added server of the added servers. Additionally, the method includes committing the first transaction after performing the first transaction.

An embodiment computer includes a processor and a non-transitory computer readable storage medium storing programming for execution by the processor. The programming including instructions to determine an updated bucket-server mapping for a massively parallel processor (MPP) database cluster in accordance with a number of initial servers and a number of added servers and determine whether a first table is to be redistributed in accordance with the updated bucket-server mapping and an initial bucket-server mapping. The programming also includes instructions to start a first transaction when the first table is to be redistributed and perform the first transaction including moving data from an initial server of the initial servers to an added server of the added servers. Additionally, the programming includes instructions to commit the first transaction after performing the first transaction.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A massively parallel processing (MPP) database system facilitates an administrator to distribute data for distributed computing applications to a number of processors, called partitions or data nodes. For example an MPP database system facilitates distributing database data to multiple data nodes for query processing in a parallel and distributed manner. MPP involves the coordinated processing of a program by multiple processors, with each processor working on different parts of the program. The processors communicate with one another to complete a task, with each of them using its own operating system and memory resources. One challenge for MPP database systems is the redistribution of data when the cluster is expanded by adding servers.

Figure 1:
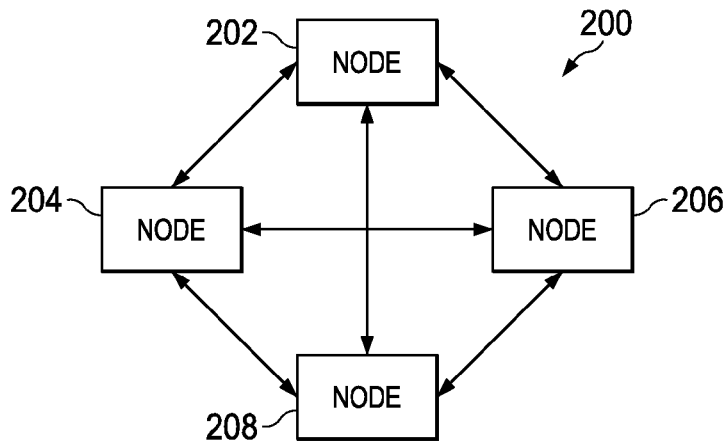
FIG. 1 illustrates an embodiment massively parallel processor (MPP) database system.

FIG. 1 illustrates an example of an MPP database system 200. System 200 illustrates four nodes: first node 202, second node 204, third node 206, and fourth node 208. Each node may communicate with each other node. Four nodes are illustrated for clarity, however, in practice more nodes, including many more nodes, may be used.

An MPP database may manage data by using partitions, and by distributing partitions to individual servers. The distribution approach uses algorithms, such as hash functions, modulo functions, and round robin functions, to compute a value for one column, referred to as a distribution column, in a table. The distribution column is used to determine which server and/or database instance will store the corresponding record. The result of those algorithms depends on the number of servers or database instances in the cluster. Adding new servers is problematic, because the MPP database cannot use them to determine which server contains the requested record. A data redistribution based on the number of servers, including the newly added server, is used to restore the consistency between the distribution algorithms' results and the location of the records used.

In one example, consistent hashing algorithms are used in peer-to-peer distributed file systems to locate distributed and duplicated data. For example, consistent hashing algorithms may be used to partition data. In consistent hashing, the output range of a hash function is treated as a fixed circular space or ring, i.e. the largest hash value wraps around to the smallest hash value, and each server in the system is assigned a random value within this space, representing its position on the ring. Each data item identified by a key is assigned to a server by hashing the data item's key to yield its position on the ring, and then walking through the ring clockwise to find the first server with a position larger than the item's position. Then, each server becomes responsible for the region in the ring between itself and its predecessor server on the ring. When one server is added, the new server becomes responsible for a data range, formally a subset of an existing nearby server in the ring. Thus, new servers only share the workload of individual servers. This approach works well with thousands of servers when their workload unbalancing is not critical to the performance of the whole system. However, an MPP database may be sensitive to workload unbalancing, and its performance may be significantly impacted by slow servers in the cluster.

In another example, a random distribution is used during cluster expansion. The data distribution becomes random after redistribution starts for serviceability of accessing the data. However, the query performance is downgraded, because those distribution algorithms do not readily locate the data. Instead a table scan is used. The whole table is redistributed.

In an additional example, new database partitions are added to share the workload when some existing database partitions exceed a particular size. Pieces of data are moved to a new database partition, depending on the deployment and replication. Additional details on replicated data distribution are further discussed in U.S. patent application Ser. No. 14/577,629 filed on Dec. 19, 2014, and entitled "Replicated Database Distribution for Workload Balancing After Cluster Reconfiguration," which this application incorporates hereby by reference.

In an embodiment, database data is redistributed after MPP database cluster expansion. Hash-distributed data is targeted. Online expansion may be achieved without affecting query performance during redistribution. The amount of data to be redistributed is low, because only data to be moved to new servers are redistributed, and data is not exchanged among existing servers. When a failure occurs, redistribution may be terminated, and the table currently undergoing redistribution goes back to the previous data distribution, while the tables which have already completed redistribution remain redistributed, including on the new servers. The redistribution may be restarted for redistribution on the remaining tables.

In an embodiment, data in tables is placed in buckets, where the buckets are associated with particular servers. The number of buckets may be adjusted online, where the number of buckets may be increased when the number of servers is increased. When servers are added, some buckets are moved to the new servers. One table at a time may be redistributed sequentially. In the event of a failure, tables which have already been redistributed remain redistributed. An embodiment works seamlessly with replication, because redistribution on replicas is performed simultaneously and transparently along with the primary copy. In a large scale cluster, tables are redistributed to different groups of servers. The table level server-bucket mapping may be adjusted to reduce the overhead and achieve workload balancing. An embodiment process is atomic and isolated.

Figure 2:
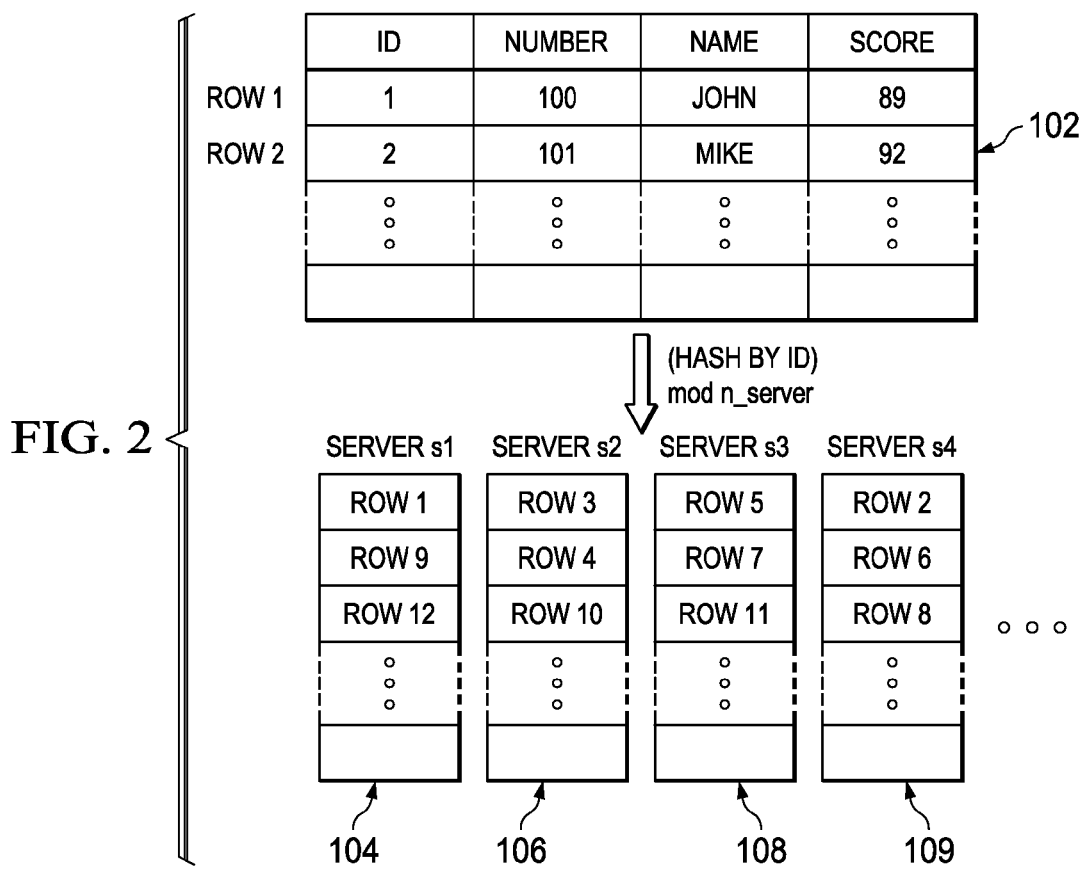
FIG. 2 illustrates a hash distribution in an MPP database.

FIG. 2 illustrates the distribution of database data to servers in an MPP database cluster using a hash function. Tables, such as table 102, have a distribution column, the table identifier (ID), which is defined when the table is created. When a row is inserted, a hash value is computed using the value of the distribution column, modulo the number of servers. The result represents the server where this row should be stored. For example, server 104 stores rows 1, 9, and 12, server 106 stores rows 3, 4, and 10, server 108 stores rows 5, 7, and 11, and server 109 stores rows 2, 6, and 8.

Figure 3:
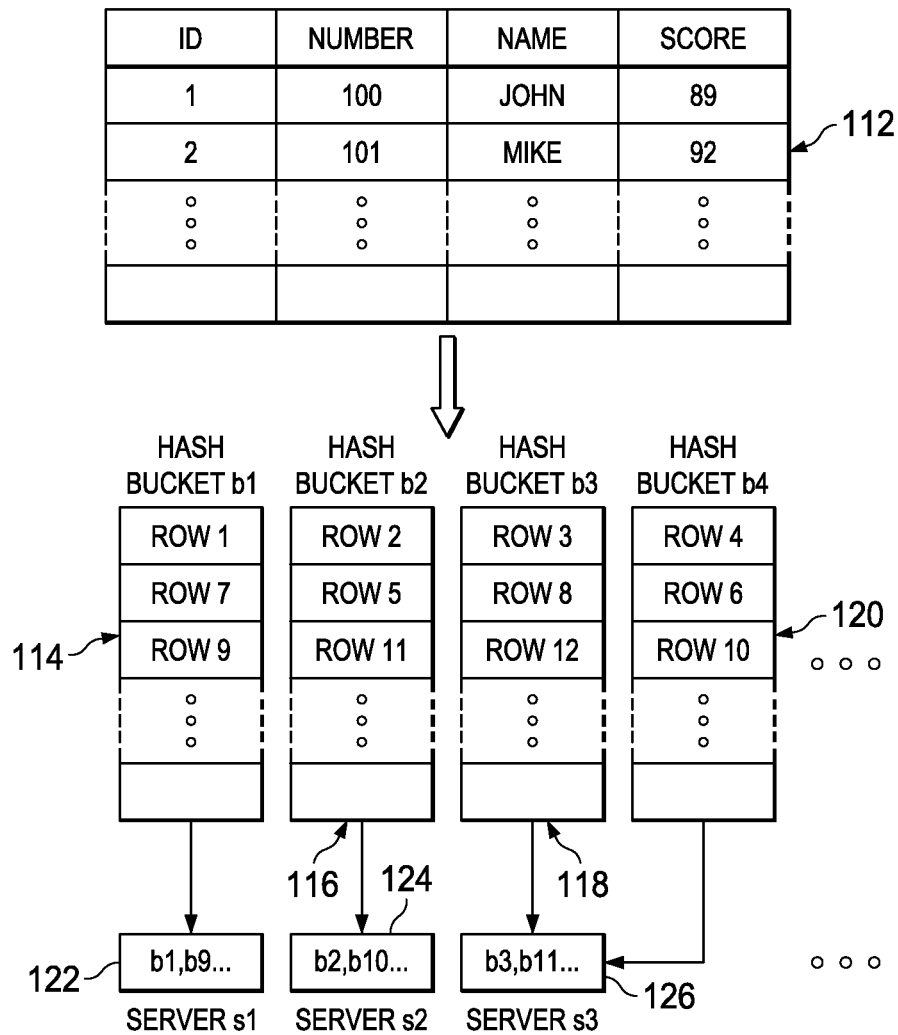
FIG. 3 illustrates an embodiment bucket distribution in an MPP database.

FIG. 3 illustrates a redistribution approach. When a row is inserted into a table, a hash value is computed. A modulo of the hash value by the number of buckets is computed. The number of buckets may be a globally defined large number, for example 4096. The number of buckets may be a power of two. Alternatively, the number of buckets is not a power of two. The number of buckets may be changed dynamically. The result of the modulo determines which bucket corresponds to the row. The row is then stored in the server to which that bucket is assigned, based on a bucket-server mapping. For example, the rows in table 112 are assigned to buckets. For example, rows 1, 7, and 9 are placed in bucket 114, rows 2, 5, and 11 are placed in bucket 116, rows 3, 8, and 12 are placed in bucket 118, and rows 4, 6, and 10 are placed in bucket 120. The rows are placed in buckets based on the modulo of the hash value. The buckets are logical groups of records, and not physical units. Then, the buckets are placed in servers. For example, buckets 1 and 9 are placed in server 122, buckets 2 and 10 are placed in server 124, and buckets 3 and 11 are placed in server 126 based on the bucket-server mapping. The number of buckets may be related to the number of servers. For example, the number of buckets may increase when the number of servers is increased to balance the load.

Figure 4:
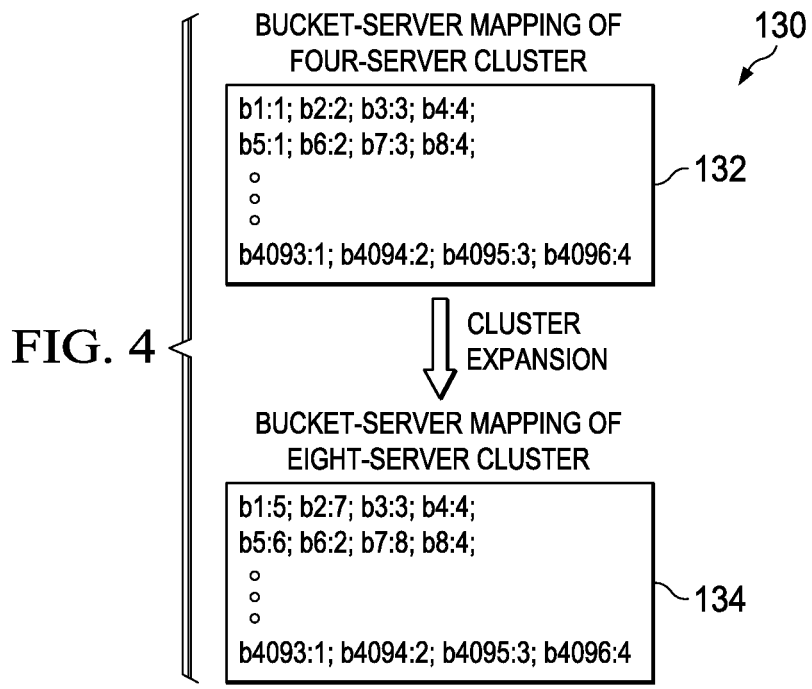
FIG. 4 illustrates embodiment bucket-server mappings in MPP database cluster expansion.

The bucket-server mapping determines which server contains a given bucket, and hence the records belonging to that bucket. In one example, the bucket-server mapping is implemented as an array, where the index to the array represents the bucket number, while the element value is the server number. FIG. 4 illustrates bucket-server mapping 130 with 4096 buckets. Four servers are added to a cluster having four servers, for a total of eight servers. In original bucket-server mapping 132, 4096 buckets are distributed among four servers. The element values in the bucket-server mapping array are between one and four. The bucket-server mapping array may be determined from the bucket number modulo the number of servers. For example, bucket 1 is stored in server 1 because 1 mod 4=1, bucket 2 is stored in server 2, because 2 mod 4=2, etc.

When another four servers are added, the buckets as well of the data would be distributed. For example, server 1 originally contains buckets 1, 5, 9, . . . , 4093. After the cluster expands from four to eight, half of server 1's buckets are redistributed to the new servers. The data redistribution may follow the new bucket distribution to evenly distribute data over the servers, including the new servers. This is illustrated by bucket-server mapping 134 with 4096 buckets distributed over eight servers. The amount of data transferred is low, because only data redistributed to new servers is moved. Also, existing servers share the data redistribution workload, and a hot spot is not caused by the redistribution.

When the total number of buckets is sufficiently close to the number of servers, the workload may be unbalanced, due to the granularity of buckets. In one example, there are 4096 buckets and 1024 servers, where each server has four buckets. The cluster expands by adding another 512 servers. When the number of buckets remains 4096, 1024 servers have three buckets and 512 servers have two buckets. Although some servers have only one additional bucket relative to other servers, this is a significant difference in workload. For example, the workload difference may be about 50% with only two buckets per server.

The bucket-server mapping may be adjusted online as the cluster expands. In one example, the number of buckets is increased by a power of two. For example, the number of buckets may double or quadruple. A small cluster with four or eight servers may have 32 buckets. When the number of servers is increased, the number of buckets may be increased to 64, 128, 256, etc. The mapping overhead is limited, and servers have a relatively even workload balance.

Figure 5:
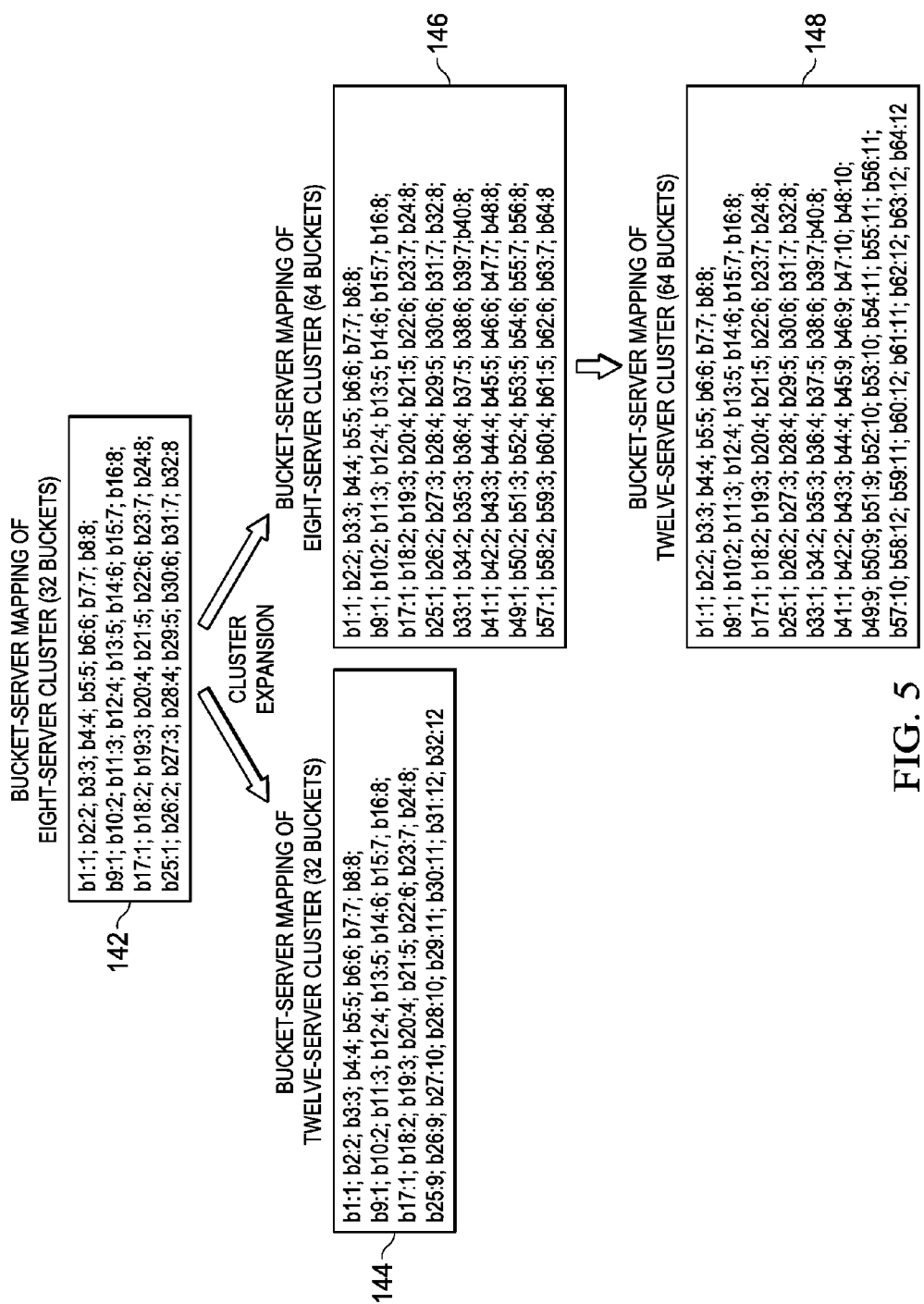
FIG. 5 illustrates additional embodiment bucket-server mappings in MPP database cluster expansion.

The number of buckets depends on the number of existing servers, the number of new servers, and the desired workload skew level. FIG. 5 illustrates a cluster with mapping 142 with eight original servers using 32 buckets, so each server has four buckets. Another four servers are added. When 32 buckets are still used, as in mapping 144, eight servers have three buckets each and four servers have two buckets each. The workload of the three bucket servers is about 50% greater than the two bucket servers. When the bucket number is increased to 64 buckets, four servers have six buckets while eight servers have five buckets, and the workload skew is about 20%. Thus, increasing the number of buckets reduces the workload skew.

Increasing the number of both buckets and servers may proceed in three stages. In the first stage, the number of buckets is increased and buckets are re-allocated based on the original bucket-server mapping, while data distribution remains unchanged. In the second stage, the bucket-server mapping is changed to include new servers, and in the third stage, data is redistributed based on the new bucket-server mapping.

Mapping 146 shows an example of increasing the number of buckets and re-allocating buckets. In mapping 146, the number of buckets is increased from 32 buckets (in mapping 142) to 64 buckets, while the number of servers remains 8. With 32 buckets before the change, a row is assigned to bucket 1, because its hash value mod 32 equals 1 (or due to a previous re-distribution). Based on the bucket-server mapping (for 32 elements) in mapping 142, bucket 1 is in server 1, so the corresponding row is in server 1. With 64 buckets, this row may be assigned to buckets 33, 41, 49, and 57. To maintain the same data distribution, the new bucket-server mapping (with 64 elements) has a value of 1 for buckets 1, 33, 41, 49, and 57.

As an example, mapping 148 has 64 buckets distributed over 12 servers. Some buckets from the original 8 servers are moved to the 4 new servers. The movement follows the rules to achieve workload balancing, where new servers have the same number of buckets (or at most one fewer or one additional bucket) while original servers contribute the same number of buckets (or at most fewer or additional bucket).

In an example, the old bucket-server mapping is still used during the transition, so the tables may be accessed as normal during the transition. Multi-version concurrency is used, so redistribution results are unseen by accesses during the redistribution, until redistribution is committed. When the redistribution is committed, the new mapping is used, and the redistribution results are seen.

Figure 6:
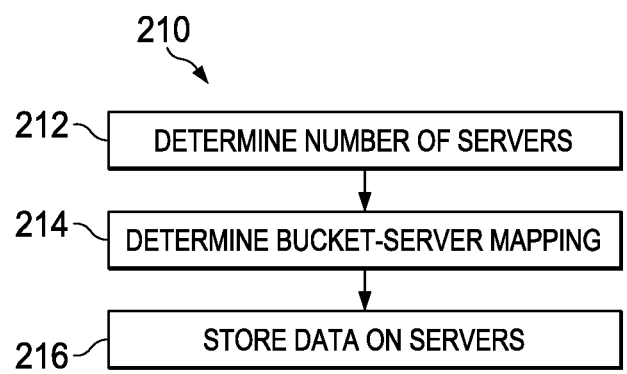
FIG. 6 illustrates a flowchart of an embodiment method of placing data on an MPP database cluster.

FIG. 6 illustrates flowchart 210 for a method of assigning data to servers in an MPP database cluster using buckets. In step 212, the system determines the number of servers in the MPP database cluster.

Next, in step 214, the system determines the bucket-server mappings and the number of buckets to be used is determined. The number of buckets is selected to maintain an acceptable level of granularity. The number may be proportional to the number of servers. The number of buckets may depend on the acceptable level of load variation. In one example, the number of buckets is a power of 2. Alternatively, another number of buckets are used. The buckets are associated with particular servers to create the bucket-server mapping. The buckets may be evenly distributed among the servers.

Then, in step 216, the data is stored on the servers based on the bucket-server mapping. The buckets are associated with particular servers. Rows of data are associated with buckets, for example. When data is placed in a bucket, it is placed on the server associated with that bucket from the bucket-server mapping based on the modulo of the hash value.

Figure 7:
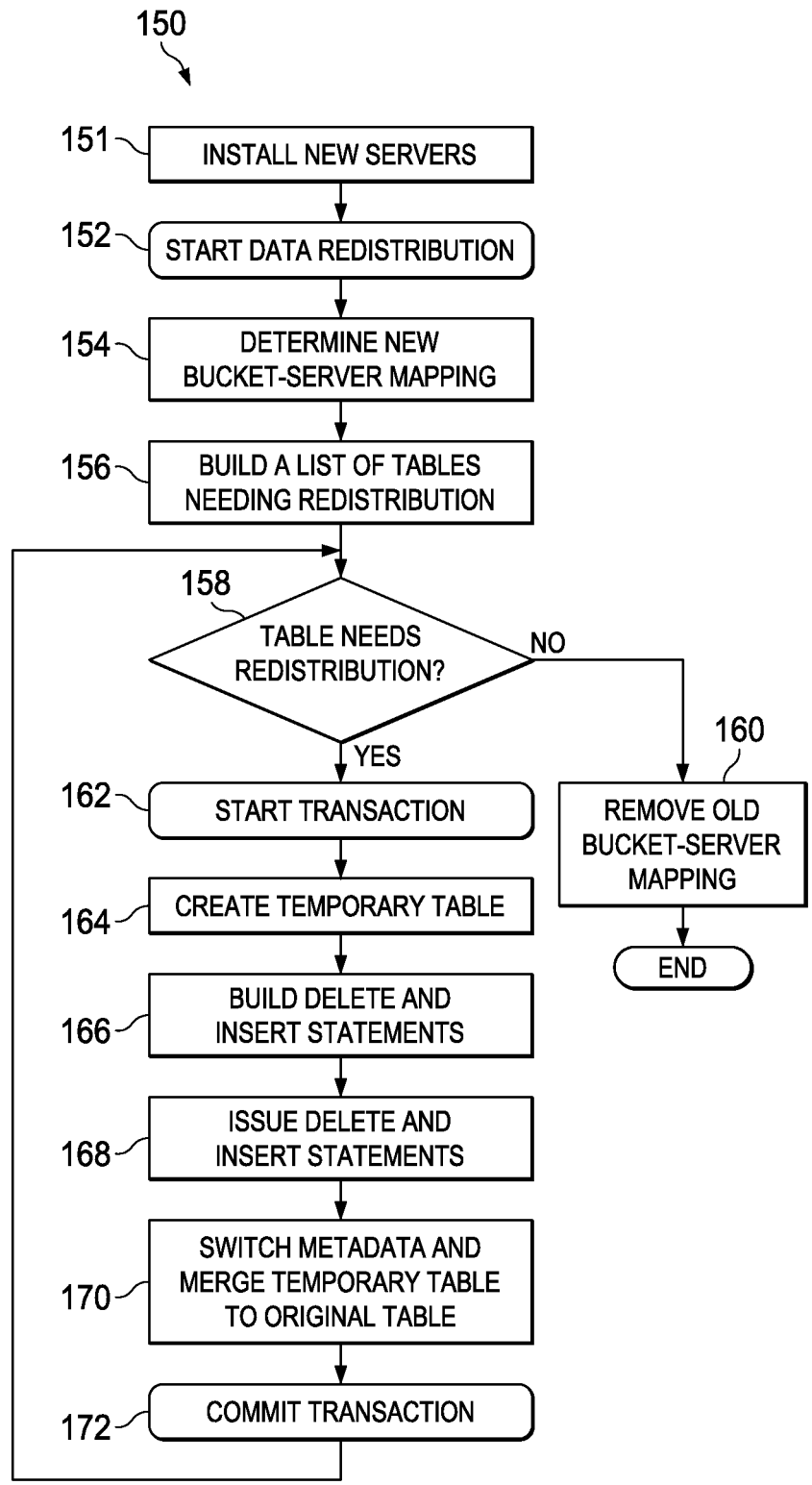
FIG. 7 illustrates a flowchart of an embodiment method of MPP database cluster expansion.

FIG. 7 illustrates flowchart 150 for a method of redistributing data in an MPP database cluster. Initially, in step 151, new servers are installed to expand a cluster. MPP database binary is installed in the newly added servers. The installed servers begin to work normally.

Next, in step 152, redistribution is started. Tables are redistributed from the old servers to the old and new servers.

Then, in step 154, a new bucket-server mapping is determined. The bucket-server mapping indicates which buckets are associated with each server. The new bucket-server mapping is determined based on the original bucket-server mapping, the number of existing servers, and the number of new servers being added. Buckets from the current servers may be relatively evenly distributed among the old and new servers, while only moving buckets from old servers to new servers. In one example, new servers have relatively fewer buckets when the number of buckets is unable to be completely evenly distributed. In another example, new servers have relatively more buckets than existing servers. Alternatively, all servers have the same number of buckets. It is determined whether this new redistribution has an acceptable variation. When the new distribution has an acceptable variation this redistribution is used. When the new redistribution has an unacceptable variation, the number of buckets is increased. For example, the number of buckets may be doubled, quadrupled, or increased by another power of two, or another power, such as 3 or 10. Then, the buckets are redistributed to the new servers, so the buckets are evenly distributed.

After the new bucket-server mapping is determined, a list of tables to be redistributed is built in step 156. This is the list of existing tables to be redistributed. The list of tables to be redistributed comes from the existing system configuration. The tables to be redistributed include tables with rows in buckets which are being redistributed.

Then, in step 158, the system determines whether there are more tables to be redistributed. This compares tables which have already been distribution (none for the first iteration) to the list of tables to be redistributed. The system redistributes one table at a time, sequentially. When all of the tables to be redistributed have already been redistributed, the system proceeds to step 160. On the other hand, when there are tables to be redistributed which have not yet been redistributed, the system proceeds to step 162.

In step 160, the system removes the old bucket-server mapping, so only the new bucket-server mapping is available. Then, the redistribution is complete, and the procedure ends. The tables are accessed normally using the new bucket-server mapping.

In step 162, the system starts a transaction for one table to be redistributed. There is a new transaction for each table to be redistributed. A new transaction for each table facilitates isolation and atomicity. Other transactions accessing the table currently being relocated see all of the data using the old bucket-server mapping without impacting performance. When the data redistribution of the table fails in the middle of the transaction, the transaction is aborted, and the failed redistribution is rolled back or invisible to other transactions.

A temporary table is created based on the new bucket-server mapping for the table to be redistributed in step 164. The temporary table has the same schema as the to-be-redistributed table, while its data distribution is based on the new bucket-server mapping. The buckets to be redistributed are selected based on the new bucket-server mapping, which may be calculated based on the old bucket-mapping, old number of servers, and the new number of servers. Records belonging to the buckets in redistribution are inserted into the temporary table, causing the records to be distributed to the temporary table's partitions in the new servers.

Next, in step 166, delete and insert statements are built based on the buckets to be moved to the new servers. This is done using the difference between the old bucket-server mapping and the new bucket-server mapping.

Then, in step 168, the delete and insert statements are issued. By issuing the delete and insert statements, records belonging to the buckets in the new servers are deleted from the original table and inserted into the temporary table. The original table, distributed in existing servers, does not include the data moved to the new servers. On the other hand, the temporary table distributed over all servers has the redistributed data only in new servers After the delete and insert statements are executed, metadata is switched and the temporary table is merged to the original table in step 170. The metadata is switched between the original table and the temporary table in the new servers, merging the temporary table into the original table.

In step 172, the transaction is committed. The temporary table is deleted, and the process sets the original table to use the new bucket-server mapping. The original table is now distributed across all servers, including the new ones. The procedure then returns to step 158, to redistribute any remaining tables to be redistributed.

Figure 8:
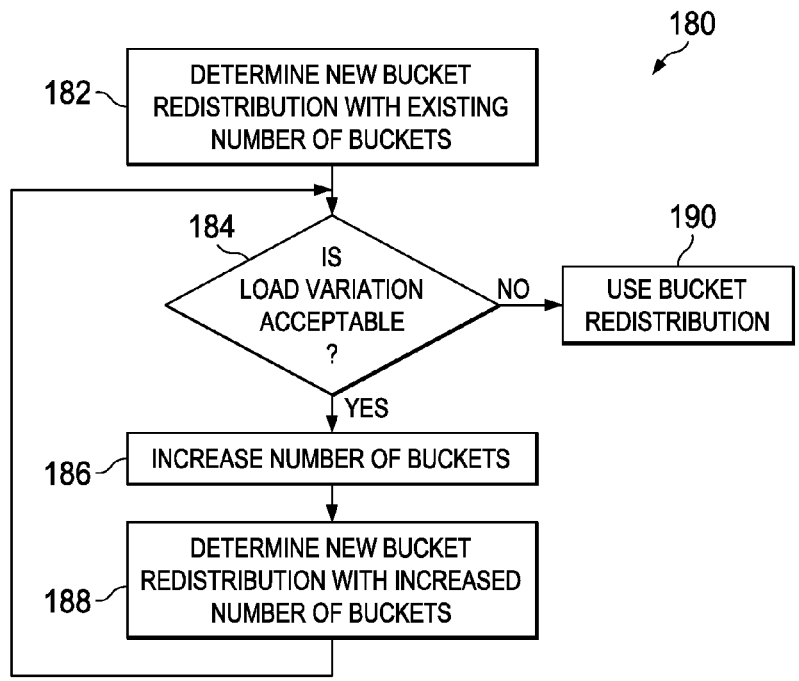
FIG. 8 illustrates a flowchart of an embodiment method of bucket redistribution in MPP database cluster expansion.

FIG. 8 illustrates flowchart 180 for a method of determining a bucket-server mapping for an expanded MPP database cluster. Initially, in step 182, the system determines an initial bucket configuration with the existing number of buckets when adding servers to an MPP cluster. The bucket configuration includes information about the buckets, such as the number of buckets and the bucket-server mapping. Buckets are redistributed from existing servers to the new servers based on their hash values. Sufficient buckets are redistributed so the bucket distribution is as even as possible.

Next, in step 184, it is determined whether the load variation is acceptable. The load of a server may be directly proportional to the amount of data, and hence the number of buckets, on that server. The percent variation of the load variation may be determined. The system may have a predetermined acceptable load variation. Alternatively, the acceptable load variation may be changed dynamically. When the load variation is acceptable with the existing number of buckets, the system proceeds to step 190, and uses this updated bucket configuration. When the load variation is not acceptable, the system proceeds to step 186.

In step 186, the system increases the number of buckets. For example the number of buckets may double, quadruple, or increase by another power of two, such as 16. In other examples, the number of buckets increases by another amount, such as a factor of 1.5, 3, or 10. The new buckets are assigned to existing servers, for example proportionally to the existing bucket distribution. For example, each existing bucket may be divided into two buckets.

Next, in step 188, the increased number of buckets is redistributed to produce the updated bucket configuration. Buckets may be redistributed relatively evenly. In one example, the minimum number of buckets is redistributed. The system then returns to step 184 to determine whether the new redistribution has an acceptable load variation.

The use of delete/insert statements, for example structured query language (SQL) statements, facilitates transparency for database replication. The same approach is used to redistribute on the replicated side as in the primary database. Because tables are processed one at a time, each table may have its own redistribution. In another example, each table is distributed to different groups of servers for workload isolation and performance tuning. Additionally, multiple tables or multiple partitions in one table may be processed in parallel for higher throughput.

Figure 9:
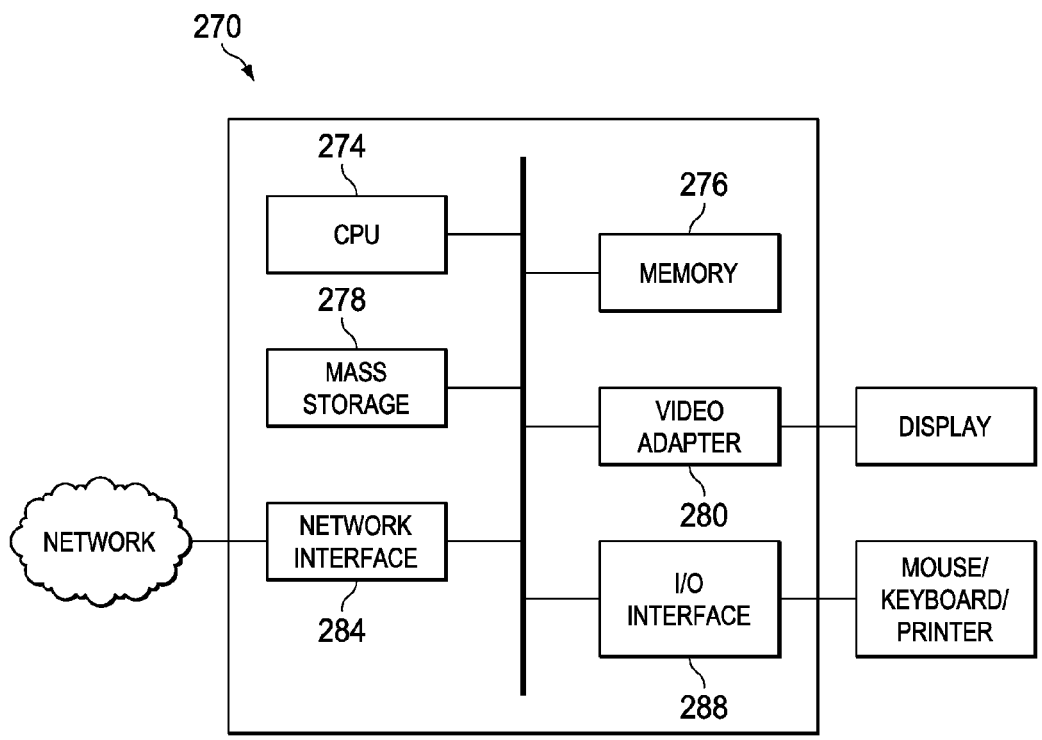
FIG. 9 illustrates a block diagram of an embodiment computer system.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touch-screen, keypad, keyboard, and the like. Also, processing system 270 may be equipped with one or more output devices, such as a speaker, a printer, a display, and the like.

The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    determining a quantity of initial servers in a massively parallel processing (MPP) database cluster;
    determining a configuration of initial buckets of the MPP database cluster, wherein the configuration of initial buckets comprises a quantity of initial buckets;
    adding at least one additional server to the MPP database cluster to produce updated servers, wherein the updated servers comprise the initial servers and the at least one additional server;
    creating a configuration of updated buckets comprising the initial buckets in accordance with the quantity of initial servers, the configuration of initial buckets, and a quantity of additional servers, wherein the configuration of updated buckets identifies a subset of buckets of the initial buckets, with the subset of buckets being transmitted to the at least one additional server from the initial servers; and
    redistributing, based on the configuration of updated buckets, data from the initial servers to the at least one additional server, with the data being associated with the subset of buckets.

2. The method of claim 1, wherein the configuration of updated buckets comprises a mapping of buckets to the updated servers, wherein each of the updated servers has either a minimum number of buckets or a maximum number of buckets, wherein the maximum number of buckets is one bucket more than the minimum number of buckets.

3. The method of claim 1, wherein creating the configuration of updated buckets comprises determining whether the quantity of updated buckets is greater than the quantity of initial buckets.

4. The method of claim 3, wherein determining whether the quantity of updated buckets is greater than the quantity of initial buckets comprises:
    determining a redistributed bucket configuration having the quantity of updated buckets and the quantity of initial buckets;
    determining a percentage load variation of the redistributed bucket configuration;
    determining whether the percentage load variation is acceptable;
    setting the quantity of updated buckets to be greater than the quantity of initial buckets when the percentage load variation is not acceptable; and
    setting the quantity of updated buckets to the quantity of initial buckets when the percentage load variation is acceptable.

5. The method of claim 1, wherein the quantity of updated buckets is a power of two of the quantity of initial buckets.

6. The method of claim 1, wherein the quantity of updated buckets is two times the quantity of initial buckets.

7. The method of claim 1, wherein the quantity of initial buckets is a power of two.

8. The method of claim 1, wherein redistributing data in a subset of buckets from the initial servers to the at least one additional server comprises:
    determining an initial bucket-server mapping;
    determining the subset of buckets to be moved from the initial servers to the at least one additional server;
    determining data associated with the subset of buckets to produce a subset of data; and
    redistributing the data associated with the subset of buckets from the initial servers to the at least one additional server.

9. The method of claim 1, further comprising placing data on the initial servers in accordance with the configuration of initial buckets before adding the at least one additional server to the MPP database cluster.

10. The method of claim 9, wherein placing the data on the initial servers comprises:
   determining a hash value for a row of a table; and
   determining a bucket associated with the row in accordance with the hash value.

11. A method comprising:
   determining an updated bucket-server mapping for a massively parallel processor (MPP) database cluster in accordance with a quantity of initial servers and a quantity of additional servers, wherein the updated bucket-server mapping identifies a subset of buckets of the initial buckets, with the subset of buckets being transmitted to the at least one additional server from the initial servers;
   determining whether a first table is to be redistributed in accordance with the updated bucket-server mapping and an initial bucket-server mapping;
   starting a first transaction when the first table is to be redistributed;
   performing the first transaction comprising redistributing data from an initial server of the initial servers to the additional servers, with the data being associated with the subset of buckets; and
   committing the first transaction after performing the first transaction.

12. The method of claim 11, wherein performing the transaction further comprises:
   creating a temporary table in accordance with the updated bucket-server mapping;
   redistributing the data in accordance with the updated bucket-server mapping; and
   merging the temporary table and the first table after redistributing the data.

13. The method of claim 12, wherein redistributing the data comprises:
   building delete statements in accordance with a difference between the updated bucket-server mapping and the initial bucket-server mapping; and
   issuing the delete statements for deleting records from the initial bucket-server mapping.

14. The method of claim 12, wherein redistributing the data comprises:
   building insert statements in accordance with a difference between the updated bucket-server mapping and the initial bucket-server mapping; and
   issuing the insert statements for insert records which is deleted from the initial bucket-server mapping to the updated bucket-server mapping.

15. The method of claim 11, further comprising:
   determining whether a second table is to be redistributed after committing the first transaction;
   starting a second transaction when the second table is to be redistributed; and
   removing the initial bucket-server mapping when the second table is not to be redistributed.

16. The method of claim 11, further comprising creating a list of tables to be redistributed, wherein determining whether the first table is to be redistributed comprises determining whether the first table is to be redistributed in accordance with the list of tables.

17. The method of claim 11, further comprising installing the additional servers before determining whether the first table is to be redistributed.

18. A computer comprising:
   a processor; and
   a non-transitory computer readable storage medium storing programming for execution by the processor, the programming including instructions to:
      determine a quantity of initial servers in a massively parallel processing (MPP) database cluster,
      determine a configuration of initial buckets of the MPP database cluster, wherein the configuration of initial buckets comprises a quantity of initial buckets,
      add at least one additional server to the MPP database cluster to produce updated servers, wherein the updated servers comprise the initial servers and the at least one additional server,
      create a configuration of updated buckets comprising the initial buckets in accordance with the quantity of initial servers, the configuration of initial buckets, and a quantity of additional servers, wherein the configuration of updated buckets identifies a subset of buckets of the initial buckets, with the subset of buckets being transmitted to the at least one additional server from the initial servers; and
      redistribute, based on the configuration of updated buckets, data from the initial servers to the at least one additional server, with the data being associated with the subset of buckets.

19. A computer comprising:
   a processor; and
   a non-transitory computer readable storage medium storing programming for execution by the processor, the programming including instructions to:
      determine an updated bucket-server mapping for a massively parallel processor (MPP) database cluster in accordance with a quantity of initial servers and a quantity of additional servers, wherein the updated bucket-server mapping identifies a subset of buckets of the initial buckets, with the subset of buckets being transmitted to the at least one additional server from the initial servers,
      determine whether a first table is to be redistributed in accordance with the updated bucket-server mapping and an initial bucket-server mapping,
      start a first transaction when the first table is to be redistributed,
      perform the first transaction comprising redistributing data from an initial server of the initial servers to the additional servers, with the data being associated with the subset of buckets; and
      commit the first transaction after performing the first transaction.

* * * * *

UNITED STATES PATENT AND TRADEMARK OFFICE
CERTIFICATE OF CORRECTION

PATENT NO. : 9,959,332 B2
APPLICATION NO. : 14/601679
DATED : May 1, 2018
INVENTOR(S) : Cai et al.

It is certified that error appears in the above-identified patent and that said Letters Patent is hereby corrected as shown below:

On the Title Page

Item (56), Column 2, "Other Publications", Line 3: replace "Conferenece" with --Conference--

In the Specification

Column 2, Line 66: replace "For example an" with --For example, an--
Column 3, Line 59: replace "Instead a table" with --Instead, a table--
Column 4, Line 9: replace "new servers are redistributed" with --new servers is redistributed--
Column 7, Line 21: replace "been distribution" with --been distributed--
Column 7, Line 65: replace "servers" with --servers.--
Column 8, Line 55: replace "processing system" with --a processing system--
Column 9, Line 34: replace "interface 284," with --interfaces 284,--

In the Claims

Claim 14, Line 48: replace "which is" with --which are--
Claim 18, Line 13: replace "cluster," with --cluster;--
Claim 18, Line 16: replace "buckets," with --buckets;--
Claim 18, Line 21: replace "server," with --server;--
Claim 19, Line 46: replace "servers," with --servers;--
Claim 19, Line 50: replace "mapping," with --mapping;--
Claim 19, Line 52: replace "redistributed," with --redistributed;--

Signed and Sealed this
Fourth Day of October, 2022

Katherine Kelly Vidal
*Director of the United States Patent and Trademark Office*